(12) United States Patent
Gupta

(10) Patent No.: US 12,520,125 B2
(45) Date of Patent: Jan. 6, 2026

(54) SEAMLESS ESIM PROFILE TRANSITION AT SUBSCRIPTION MANAGEMENT DATA PREPARATION (SMDP+) SERVER VIA OVER-THE-AIR (OTA) SERVER

(71) Applicant: RAKUTEN SYMPHONY, INC., Tokyo (JP)

(72) Inventor: Ashutosh Gupta, Indore, IN (US)

(73) Assignee: RAKUTEN SYMPHONY, INC., Tokyo (JP)

(*) Notice: Subject to any disclaimer, the term of this patent is extended or adjusted under 35 U.S.C. 154(b) by 400 days.

(21) Appl. No.: 18/040,265

(22) PCT Filed: Nov. 21, 2022

(86) PCT No.: PCT/US2022/050527
§ 371 (c)(1),
(2) Date: Feb. 2, 2023

(87) PCT Pub. No.: WO2024/112315
PCT Pub. Date: May 30, 2024

(65) Prior Publication Data
US 2025/0097691 A1    Mar. 20, 2025

(51) Int. Cl.
*H04W 8/20* (2009.01)
*H04W 8/18* (2009.01)
*H04W 8/22* (2009.01)

(52) U.S. Cl.
CPC ............. *H04W 8/20* (2013.01); *H04W 8/183* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 10,187,784 B1* | 1/2019 | Chen | H04L 67/306 |
| 10,687,204 B1* | 6/2020 | Roy | G06F 21/73 |
| 10,904,741 B2* | 1/2021 | Chen | H04B 1/3816 |
| 11,026,094 B2* | 6/2021 | Park | H04W 8/265 |
| 11,057,827 B1* | 7/2021 | Dreiling | H04W 60/04 |
| 11,115,807 B2* | 9/2021 | Larignon | H04W 12/35 |

(Continued)

FOREIGN PATENT DOCUMENTS

WO     2022/031148 A1     2/2022

OTHER PUBLICATIONS

"EUICC Profile Package: Interoperable Format Test Specification," Trusted Connectivity Alliance, Version 2.3.1, Sep. 2020.*

(Continued)

*Primary Examiner* — Melvin H Pollack
(74) *Attorney, Agent, or Firm* — HAUPTMAN HAM, LLP

(57) ABSTRACT

A seamless eSIM profile transition is provided at Subscription Management Data Preparation (SMDP+) server via Over-The-Air (OTA) server. A request to download a profile package to an embedded Universal Integrated Circuit Card (eUICC) of a user equipment (UE) is received. The profile package is sent to the eUICC. A device capability of the eUICC is determined, e.g., whether the device is 4G capable or 5G capable. Based on the determined device capability of the eUICC; a request is sent to an OTA server to configure the eUICC according to the determined device capability.

20 Claims, 9 Drawing Sheets

(56) References Cited

U.S. PATENT DOCUMENTS

| | | | | |
|---|---|---|---|---|
| 11,457,348 | B2* | 9/2022 | Vikberg | H04W 12/068 |
| 11,533,160 | B2* | 12/2022 | Yang | H04L 67/30 |
| 11,617,065 | B2* | 3/2023 | Lankalapalli | H04L 67/141 |
| | | | | 709/220 |
| 11,706,689 | B2* | 7/2023 | Butler | H04W 48/18 |
| | | | | 455/418 |
| 11,785,456 | B2* | 10/2023 | Gundavelli | H04W 12/04 |
| | | | | 726/7 |
| 11,838,984 | B2* | 12/2023 | Balasubramanian | H04W 4/60 |
| 11,871,227 | B2* | 1/2024 | Lee | H04W 12/40 |
| 11,903,089 | B2* | 2/2024 | Kang | H04W 48/18 |
| 11,917,413 | B2* | 2/2024 | Lee | H04W 4/70 |
| 11,930,367 | B2* | 3/2024 | Seo | H04W 8/183 |
| 11,930,557 | B2* | 3/2024 | Seo | H04W 8/18 |
| 11,950,320 | B2* | 4/2024 | Lim | H04W 8/183 |
| 12,041,690 | B2* | 7/2024 | Kang | H04W 8/183 |
| 12,050,919 | B2* | 7/2024 | Lee | G06F 8/61 |
| 12,069,045 | B2* | 8/2024 | Ståhl | H04W 8/205 |
| 12,081,969 | B2* | 9/2024 | Sureshlal | H04W 12/069 |
| 12,082,303 | B2* | 9/2024 | Lim | H04W 8/205 |
| 12,089,289 | B2* | 9/2024 | Ramprasad | H04W 36/30 |
| 12,114,166 | B2* | 10/2024 | Nitsch | H04W 12/04 |
| 12,127,305 | B2* | 10/2024 | Li | H04W 12/0431 |
| 12,133,291 | B2* | 10/2024 | Gundavelli | H04W 12/35 |
| 12,160,735 | B2* | 12/2024 | Koo | H04W 8/183 |
| 12,160,926 | B2* | 12/2024 | Kang | H04W 60/005 |
| 12,207,342 | B2* | 1/2025 | Akdim | H04W 64/00 |
| 12,245,332 | B2* | 3/2025 | Jin | H04W 60/04 |
| 12,273,958 | B2* | 4/2025 | Li | H04W 8/183 |
| 12,279,336 | B2* | 4/2025 | Yoon | H04W 8/183 |
| 2022/0232385 | A1* | 7/2022 | Seo | H04W 12/35 |
| 2023/0209340 | A1* | 6/2023 | Kang | H04W 12/43 |
| | | | | 455/410 |
| 2023/0354008 | A1* | 11/2023 | Uy | G06Q 20/347 |
| 2023/0354040 | A1* | 11/2023 | Li | H04W 8/183 |
| 2024/0244418 | A1* | 7/2024 | Sasagawa | H04L 67/303 |
| 2024/0292205 | A1* | 8/2024 | Nitsch | H04W 12/0431 |
| 2024/0292348 | A1* | 8/2024 | Luetzenkirchen | H04L 65/80 |
| 2024/0365106 | A1* | 10/2024 | Nitsch | H04L 67/306 |

OTHER PUBLICATIONS

"EUICC Profile Package: Interoperable Format Technical Specification," Trusted Connectivity Alliance, Version 2.3.1, Nov. 2019.*
EUICC Profile Package: Interoperable Format Test Specification, Version 2. 3. 1, mailed Sep. 2020, Trusted Connectivity Alliance, 26pp.

* cited by examiner

SEAMLESS ESIM PROFILE TRANSITION AT SUBSCRIPTION MANAGEMENT DATA PREPARATION (SMDP+) SERVER VIA OVER-THE-AIR (OTA) SERVER

RELATED APPLICATIONS

The present application is a National Phase of International Application No. PCT/US2022/050527, filed Nov. 21, 2022.

TECHNICAL FIELD

This description relates to seamless eSIM profile transition at Subscription Management Data Preparation (SMDP+) server via Over-The-Air (OTA) server, and method of using the same.

BACKGROUND

Mobile devices, such as smart phones, tablets, etc., are configured to utilize Universal Integrated Circuit Cards (UICCs) that enable the mobile devices to access wireless services provided by telecom operators/service providers. The UICC identifies a user equipment (UE) on a particular mobile network. Once the user equipment is registered with the mobile network using the SIM, the user equipment (UE) utilizes the mobile communication service from the mobile network of the registration destination. However, a UICC-enabled SIM limits the user to one default profile, which is placed on the SIM card at the time of manufacture. This profile is static. If the user wants to switch carrier profiles, the user replaces the SIM card within the UE.

With the development of Embedded Universal Integrated Circuit Cards (eUICCs), users have the ability to change service provider over-the-air (OTA), without physically changing the embedded SIM card itself. Remote SIM provisioning allows consumers to remotely activate the subscriber identity module (SIM) embedded in a portable device, such as a smart phone, smart watch, fitness band or tablet computer.

Remote SIM Provisioning enables control over remote provisioning and local management of operator Profiles by the end user of the UE. The solution is organized around the SM-DP+ (Subscription Manager-Data Preparation+), wherein the "+" indicates the encapsulation of the SM-DP and the SM-SR (Subscription Management Secure Routing). The SM-DP+ is responsible for the creation, download, remote management (enable, disable, update, delete), and the protection of operator credentials (the Profiles).

To create 4G and 5G profiles for a subscriber, the SMDP+ creates the 4G and 5G Profiles for the consumer device. However, operators have found it difficult to manage multiple profiles for subscribers. For example, porting of a eUICC Profile 4G to 5G or 5G to 4G supported handset is very complex. Duplication of Records/Profiles is used on the SMDP+ database. At the SMDP+, two profile records are created in the profile inventory for the same subscriber. Both of the Profiles are able to be enabled by the subscriber but not both, so another profile is not useful to the subscriber or to the Telecom Operator/Service Provider. Thus, lots of memory in the SMDP+ database is wasted. The telecom operator also creates different production batches: one for 4G eUICC profiles and another for 5G eUICC profiles. This is very expensive for the telecom operators. However, seamless eSIM profile transitioning that uses OTA signaling at the SDDP+ server does not exist.

SUMMARY

In at least embodiment, a method for method for provisioning a device profile includes receiving, by a Subscription Management Data Preparation (SMDP+) server, a request to download a profile package to an embedded Universal Integrated Circuit Card (eUICC) of a user equipment (UE), sending, by the SMDP+ server, the profile package to the eUICC, determining, by the SMDP+ server, a device capability of the eUICC, and based on the determined device capability of the eUICC, sending a request by the SMDP+ server to an Over-The-Air (OTA) server to configure the eUICC according to the determined device capability.

In at least one embodiment, a Subscription Management Data Preparation (SMDP+) server for provisioning a profile includes a memory storing computer-readable instructions, and a processor connected to the memory, wherein the processor is configured to execute the computer-readable instructions to receive a request to download a profile package to an embedded Universal Integrated Circuit Card (eUICC) of a user equipment (UE), send the profile package to the eUICC, determine a device capability of the eUICC, and based on the determined device capability of the eUICC, send a request to an Over-The-Air (OTA) server to configure the eUICC according to the determined device capability.

In at least one embodiment, a non-transitory computer-readable media having computer-readable instructions stored thereon, which when executed by a processor causes the processor to perform operations including receiving, by a Subscription Management Data Preparation (SMDP+) server, a request to download a profile package to an embedded Universal Integrated Circuit Card (eUICC) of a user equipment (UE), sending, by the SMDP+ server, the profile package to the eUICC, determining, by the SMDP+ server, a device capability of the eUICC, and based on the determined device capability of the eUICC, sending a request by the SMDP+ server to an Over-The-Air (OTA) server to configure the eUICC according to the determined device capability.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
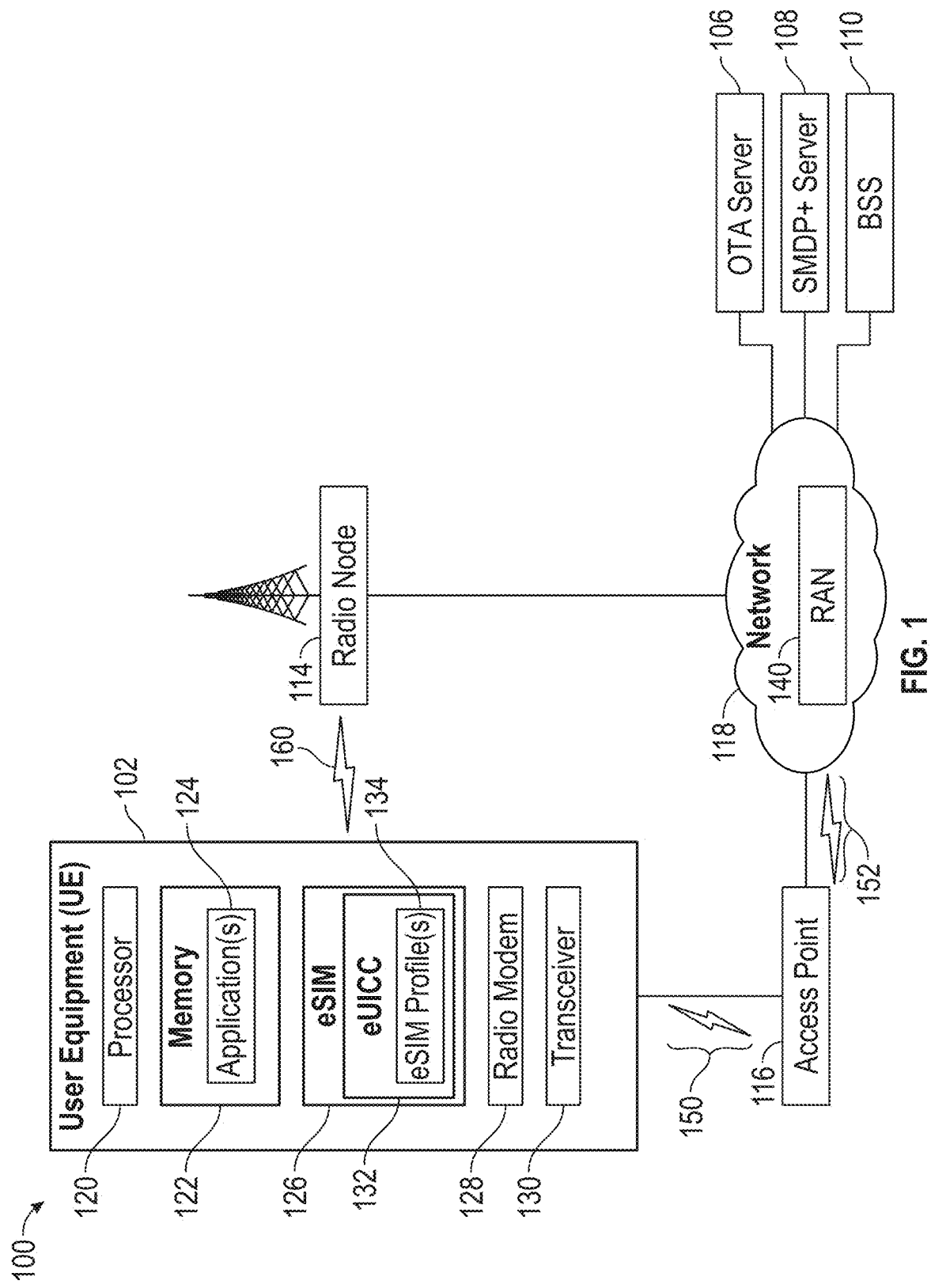
FIG. 1 is a diagram of a system for providing seamless eSIM profile transition at Subscription Management Data Preparation (SMDP+) server via Over-The-Air (OTA) server according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" generally indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and ""at least one of A, B, or C" includes A, B, C, A and B, A and C, B and C, or A and B and C.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming data-stream or signaling-stream from UE.

Embodiments described herein provide seamless eSIM profile transition at Subscription Management Data Preparation (SMDP+) server via commands to user equipment (UE) sent by an Over-The-Air (OTA) server. The SMDP+ server receives a request to download a profile package to an embedded Universal Integrated Circuit Card (eUICC) of the UE. The SMDP+ server sends the profile package to the eUICC, and determines a device capability of the eUICC. Based on the determined device capability of the eUICC, the SMDP+ server sends a request to an OTA server for the eUICC to configure the UE according to the determined device capability.

Embodiments described herein provide method that provides one or more advantages. For example, a new device is automatically updated from OTA Server to either create of delete files in eUICC to make it compatible with a determined device capability. Users are relieved from determining the details of the files for configuring a device. The provisioning of profiles by SMDP+ server via the OTA server reduces the cost associated with generating eUICC profiles by telecom operators. Duplication of profiles for 4G and 5G subscribers is reduced thereby saving database storage at the SMDP+ side.

FIG. 1 is a diagram of a system 100 for providing seamless eSIM profile transition at Subscription Management Data Preparation (SMDP+) server via Over-The-Air (OTA) server according to at least one embodiment.

In FIG. 1, system 100 includes UE 102, an OTA Platform 106, a SMDP+ Server 108, a Business Support Systems (BSS) 110, a Radio Node 114, an Access Point 116, and a Network 118. UE 102 includes Processor 120 and Memory 122. Memory 122 includes non-transitory memory portion that stores Application 124. UE 102 also includes an eSIM 126, a Radio Modem 128, and a Transceiver 130 (e.g., a Wi-Fi Transceiver). The eSIM 126 includes an Embedded Universal Integrated Circuit Card (eUICC) 132. In different embodiments, the UE 102 is a mobile phone, a media player, a laptop computer, a tablet computer, a notebook computer, an IoT device, a smart watch, a fitness band, smart glasses (or other wearable computer), or any other device providing communication and processing services.

The Radio Modem 128 includes a mobile radio transceiver and a processor. Alternatively, the mobile radio transceiver is a separate component from Radio Modem 128. UE 102 establishes a wireless communication link with Radio Node 114, such as an Evolved Node B (eNodeB or eNB), Next Generation e-NodeB (ng-eNB), Next Generation Node B d (gNB), or other type of wireless base station. Radio Node 114 provides access to Network 118 using any of a variety of wireless communication protocols.

UE 102 is also able to be configured to use Transceiver 130 to establish a communication link with, for example, Access Point 116 to provide access to Network 118. Network 118 is one or more private networks, one or more public networks, or a combination thereof. For example, Network 114 includes Radio Access Network (RAN) 140 of a telecommunications service provider.

RAN 120 is responsible for managing radio resources, including strategies and algorithms for controlling power, channel allocation and data rate. RANs 120 have evolved over time, from 3G to 5G. For example, RANs 120 are implemented in various configurations, such as Global System for Mobile Communications (GSM) RAN (GRAN), GSM Enhanced Data Rates for GSM Evolution (EDGE) RAN (GERAN), Universal Mobile Telecommunications Service (UMTS) Terrestrial RAN (UTRAN), Evolved UMTS Terrestrial RAN (E-UTRAN), Centralized/Cloud RAN (CRAN), Virtualized RAN (VRAN), and Open RAN (ORAN). UE 102 accesses Network 118 for communication services.

Connections 150, 152 are implemented using at least one of a wireless connection or a wired connection. In at least one embodiment, Connections 150, 152 are implemented as a wireless connection in accordance with any IEEE 802.11 Wi-Fi protocols, Bluetooth protocols, Bluetooth Low Energy (BLE), or other short range protocols that operate in accordance with a wireless technology protocol for exchanging data using any licensed or unlicensed band such as the citizens broadband radio service (CBRS) band, 2.4 GHz bands, 5 GHz bands, or 6 GHz bands. Additionally, in at least one embodiment, Connections 150, 152 are implemented using a wireless connection that operates in accordance with, but is not limited to, RF4CE protocol, ZigBee protocol, Z-Wave protocol, or IEEE 802.15.4 protocol. In at least one embodiment, Connections 150, 152 are implemented using a coax (MoCA) network. In at least one embodiment, Connections 150, 152 are a wired Ethernet connection. Connection 160 is implemented as a 4G or 5G connection, depending on Radio Modem 128 and Radio Node 114.

BSS 110 is the software and processes used for the "back office" to function. The scope of BSS 110 includes managing rating, orders, products, billing, fraud, and customer relations. Also included are providing revenue assurance and business intelligence. BSS 110 creates Production Batch Request on a SMDP+ Server 108 for creation of Profiles. BSS 110 provides an Input file to SMDP+ 108 which contains subscriber Information (IMSI, ICCID, MSISDN etc.) After generation of Profile, BSS 110 receive the output file for that corresponding Batch. The output file contains the Subscriber Information along with generated OTA keys for the subscribers.

SMDP+ Server 108 is an online resource that makes eSIM Profiles 134 available for download to UE 102. The eSIM Profile 134 is the software that is downloaded to an eSIM-enabled device, e.g., UE 102, to access a mobile network. SMDP+ Server 108 distributes eSIM Profiles 134 used to access network 118. Data carriers will collect IMEI and EID numbers from subscribers and "provision" an eSIM for UE on the SMDP+ Server 108. UE 102 contacts the SMDP+ Server 108 to download eSIM Profile 134.

Over-The-Air (OTA) Server 106 communicates with eSIM 126, downloads applications to eSIM 126, and manages eSIM 126, eUICC 132, and eSIM Profile 134 without being physically connected to eSIM 126. Thus, OTA Server 106 updates and changes data in eSIM 126. This process is referred to as Over-the-Air provisioning.

Figure 2:
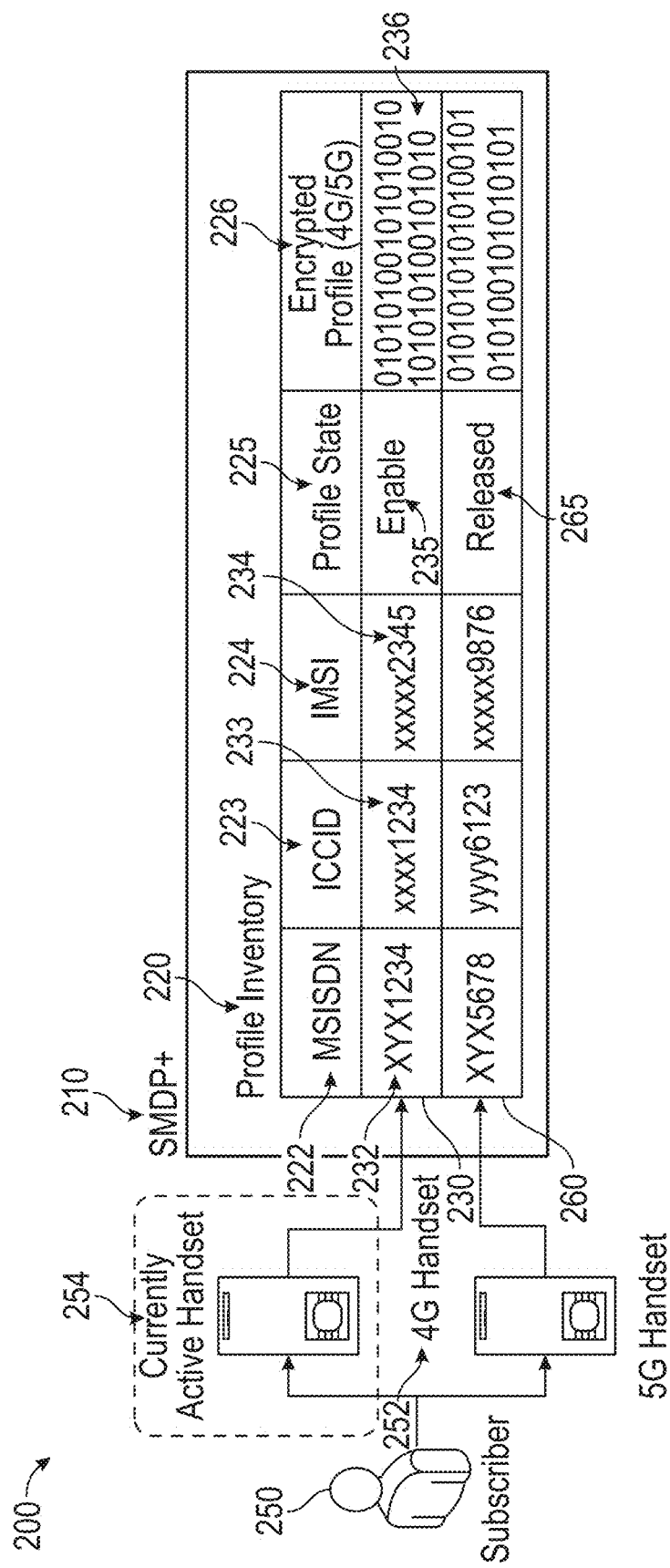
FIG. 2 illustrates provisioning of a 4G profile according to at least one embodiment.

FIG. 2 illustrates provisioning of a 4G profile 200 according to at least one embodiment.

In FIG. 2, Subscription Management Data Preparation (SMDP+) server 210 includes Profile Inventory 220. Profile Inventory 220 shows entries for Mobile Station Integrated Services Digital Network (MSISDN) 222, Integrated Circuit Card Identification (ICCID) 223, International Mobile Subscriber Identity (IMSI) 224, a Profile State 225, and an Encrypted Profile (4G/5G) file 226.

MSISDN 222 is a number that uniquely identifies a subscription in a GSM or a UMTS mobile network. An MSISDN 222 is the phone number associated with a SIM/UICC card or eUICC and is the number to which calls or SMS messages are routed. The MSISDN 222 is used to identify a mobile user when they make a call or send an SMS. ICCID 223 is a 19- or 20-digit number, which is typically printed on the back of a SIM/UICC card.

The ICCID 223 is a globally unique serial number that identifies a particular SIM/UICC card. The ICCID 223 helps identify UE when connecting to networks and are used when retrieving or updating information on SIMs over the air. IMSI 224 is a number that uniquely identifies users of a cellular network. IMSI 224 is stored as a 64-bit field and is sent by the mobile device to the network. IMSI 224 is also used for acquiring other details of the mobile device. The IMSI 224 is used in any mobile network that interconnects with other networks.

Profile Inventory 220 shows, for a 4G Profile 230, MSISDN 222 of "XYX1234" 232, ICCID 223 of "xxxx1234" 233, and IMSI 224 of "xxxxx2345" 234. Subscriber 250 has a 4G handset 252 that is a Currently Active Handset 254. Thus, the 4G Profile 230 is indicated as having a Profile State 225 of Enable 235. The 4G Profile 230 uses 4G Encrypted Profile 236.

Because Subscriber 250 does not use the 5G Profile 260, Profile State 225 is Released 265. The Profile Inventory 220 thus includes 2 profile records, i.e., 4G Profile 230 and 5G Profile 260 that have been created for the same Subscriber 250. Either the 4G Profile 230 or the 5G Profile is used by the Subscriber 250, but the Subscriber 250 uses the 4G Profile 230 and the 5G Profile 260 is not useful to the Subscriber 250 or the telecom operator that created 4G Profile 230 and 5G Profile 260. Thus, memory in Profile Inventory 220 is wasted. Further, the creation of 4G Profile 230 and 5G Profile 260 by the telecom operator results in a wasted expense.

Figure 3:
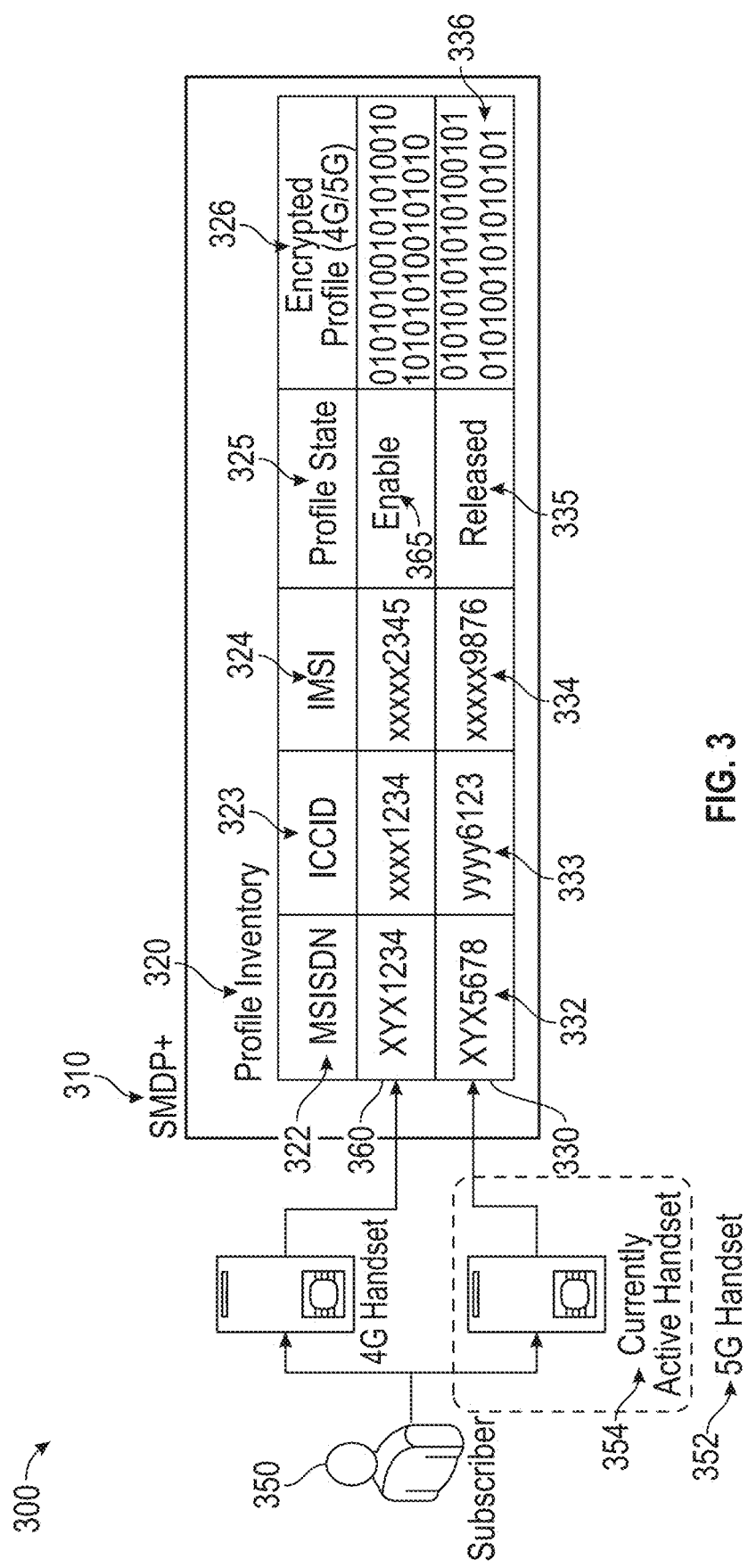
FIG. 3 illustrates provisioning of a 5G profile according to at least one embodiment.

FIG. 3 illustrates provisioning of a 5G profile 300 according to at least one embodiment.

In FIG. 3, SMDP+ server 310 includes a Profile Inventory 320. Profile Inventory 320 again shows entries for MSISDN 322, ICCID 323, IMSI 324, Profile State 325, and Encrypted Profile (4G/5G) file 326.

Profile Inventory 320 shows, for a 5G Profile 330, MSISDN 322 of "XYX5678" 332, ICCID 323 of "yyyy1234" 333, and IMSI 324 of "xxxxx9876" 334. Subscriber 350 has a 5G handset 352 that is a Currently Active Handset 354. Thus, the 5G Profile 330 is indicated as having a Profile State 325 of Enable 335. The 5G Profile 330 uses 5G Encrypted Profile 336.

Because Subscriber 350 does not use the 4G Profile 360, the Profile State 325 is Deleted 365. The Profile Inventory 320 thus includes 2 profile records, i.e., 5G Profile 330 and 4G Profile 360 that have been created for the same Subscriber 350. Again, either the 5G Profile 330 or the 4G Profile is used by the Subscriber 350, but the Subscriber 350 uses only the 5G Profile 330 and the 4G Profile 360 is not useful to the Subscriber 350 or the telecom operator that created 5G Profile 330 and 4G Profile 360. Thus, memory in the Profile Inventory 320 is wasted. Further, the creation of 5G Profile 330 and 4G Profile 360 by the telecom operator results in a wasted expense.

Figure 4:
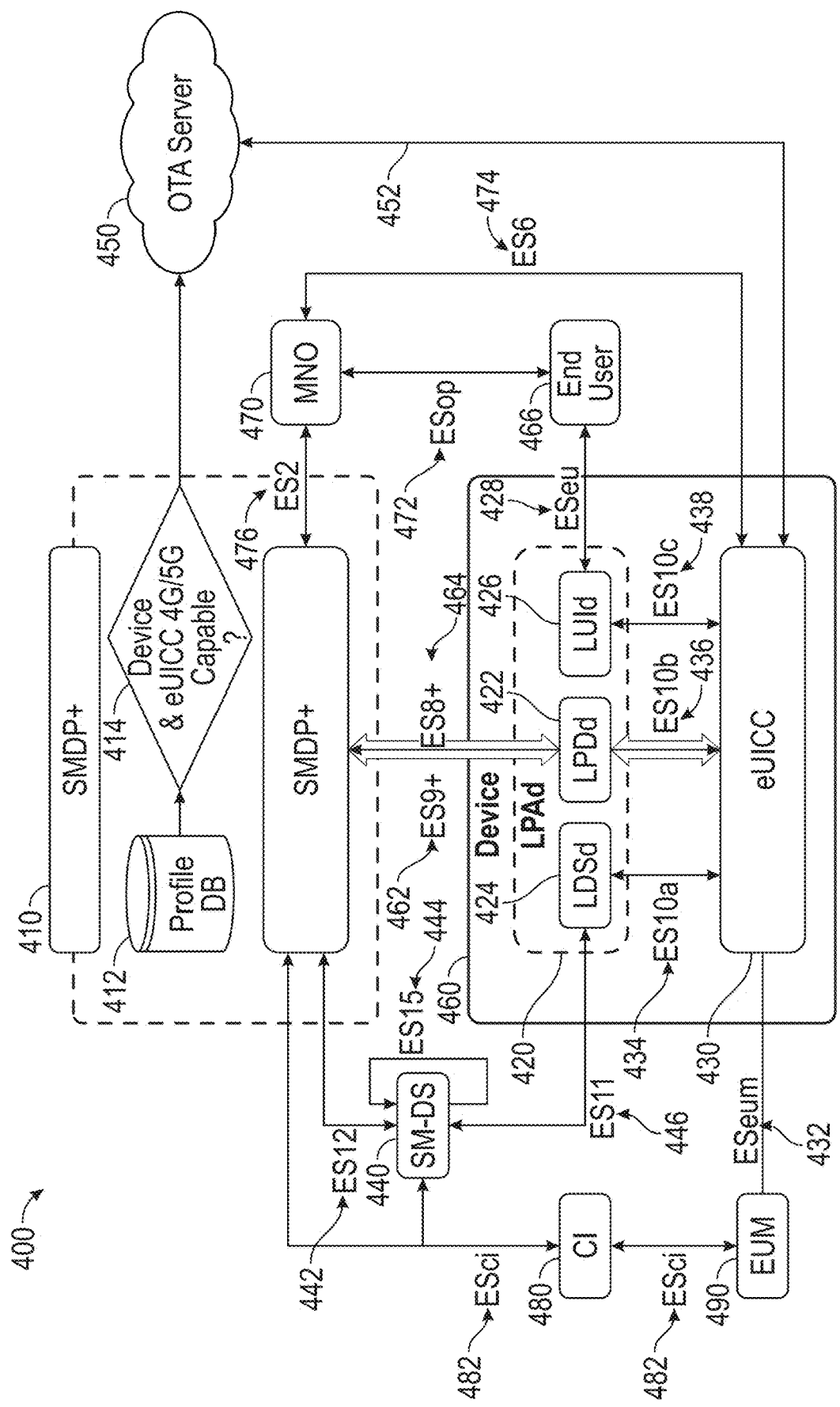
FIG. 4 is an OTA-based SIM provisioning architecture according to at least one embodiment.

FIG. 4 is an OTA-based SIM provisioning architecture 400 according to at least one embodiment.

In FIG. 4, the OTA-based SIM provisioning architecture 400 includes SMDP+ 410, Local Profile Assistant (LPA) 420, embedded Universal Integrated Circuit Card (eUICC)

430, Subscription Manager-Discovery Server (SM-DS) 440, and Over-The-Air (OTA) Server 450.

SMDP+ 410 is responsible for the creation, download, remote management (enable, disable, update, delete) and the protection of operator credentials (the Profile). A Local Profile Assistant (LPA) 420 provides the capability to download encrypted Profiles to the eUICC. The LPA 420 also presents the local management end user interface to the end user so the users are able to manage the status of Profiles on the eUICC 430. The LPA 420 is able to be built into the eUICC 430. The eUICC 430 is a secure element that contains one or more subscription Profiles. A Profile enables the eUICC to function in the same way as a removable SIM issued by the operator. SM-DS 440 provides a means for an SMDP+ 410 to reach the eUICC 430 without knowing which network the UE is connected to. Accordingly, UEs are able to be connected using different access networks with different addresses. The SM-DS 440 overcomes this by allowing SMDP+ 410 to post alerts to a secure noticeboard and for UEs to extract those alerts and is used to notify the LPA 420 when Profile data is available for download to the eUICC 430. Notifications are sent from the SMDP+ 410 to the SM-DS 440. The LPA 420 polls the SM-DS 440 for notifications when used (supporting the "pull" model). Polling frequency is determined by the state of the eUICC 430 and by end user actions.

OTA Server 450 sends SMS or HTTPS commands to create or remove a 5G files system in the eUICC 430. The OTA Server 450 also triggers the reset applet in the eUICC 430 so that the eUICC 430 instructs the UE 460 to perform refresh so that the UE 460 reads the Files System again and requests for 4G/5G authentication.

An eSIM or profile includes software and authentication functions related to a mobile network operator (MNO) 470. The profile is present on a secure element (SE) within a wireless device receiving services from the MNO 470. Universal integrated circuit cards (UICCs) and embedded UICCs (eUICCs) are examples of SEs used for hosting profiles. A new profile is provisioned by SMDP+ Server 410 to eUICC 430 of device 460.

A profile is a combination of operator data and applications provisioned on an SE in a device for the purpose of providing services by an operator, for example, an MNO 470. An SE is identified by an eUICC identifier, which is a unique number that is referred to as an EID. A profile is identified by a unique number an Integrated Circuit Card Identifier (ICCID).

An enabled profile includes files and/or applications which are selectable over an interface between an SE of device 460 and processing circuitry of the device external to the SE. To use the device, the profile is activated with the MNO 470. Placing a new profile on an SE within device 460 is referred to as provisioning. A logical entity in the device that assists with provisioning is a combination of hardware, firmware, and/or device software, including for example a Local Profile Assistant (LPA) 420.

Communications of an eUICC is authenticated using public key infrastructure (PKI) techniques. Certificates used for authentication and confidentiality purposes are generated by a certificate issuer (CI) 480. SM-DS 440 holds a list of profiles that are available to an end user in eUICC 430. SM-DS 440 and the eUICC Manufacturer (EUM) 490 use ESci interface 482 to request a Certificate and retrieve Certificate revocation status from Certificate Issuer (CI) 480. A Certificate issued by CI 480 to EUM 490 is used to verify eUICC Certificates. EUM 490 is the manufacturer of an eUICC 430. EUM 490 and eUICC 430 communicate via the ESeum Interface 432.

SMDP+ 410 takes the raw profile information from an MNO 470, personalizes it with the appropriate IMSI/Ki pair information, converts it to the appropriate format for an eUICC 430 and cause the profiles to be provided to the eUICC 430.

In response to being located in device 460, the LPA 420 is referred to as LPAd. The LPA is also able to be in the eUICC, i.e., LPAe. The LPA 420 provides features of a Local Profile Download (LPD) 422, Local Discovery Services (LDS) 424, and a Local User Interface (LUI) 426.

LPA 420 transmits information stored in the eUICC 430 (e.g., MNO network information, MNO profile information, and the like) to SMDP+ 410, or stores information received from the SMPD+ 410 via the ES9+ interface 464 in the eUICC 430. The ES9+ 462 interface provides a secure transport for the delivery of the Bound Profile Package between the SM-DP+ 410 and the LPAd 420. ES8+ 464 provides a secure end-to-end channel between the SMDP+ 410 and the eUICC 430 for the administration of the profile during download and installation.

The End User 466 communicates with the LUI 426 via the ESeu interface 428. Local Profile Management are operations that are locally initiated on the ESeu interface 428. Local Profile Management Operations include enable Profile, disable Profile, delete Profile, query Profile Metadata, eUICC Memory Reset, eUICC test memory reset, set/edit nickname, add a profile, and edit default SMDP+ address.

The ES12 interface 442 allows the SMDP+ 410 to issue or remove event registrations on the SM-DS 440. In the case of deployments with cascaded SM-DSs 440, the ES15 interface 444 is used to connect the SM-DSs 440. The ES11 interface 446 allows the LDS 424 to retrieve Event Records for the respective eUICC 430.

The ES10a interface 434 is used by the LPAd 420 in the Device 460 to obtain the configured addresses from the eUICC 430 for Root SM-DS 440, and optionally the default SM-DP+ 410. The ES10b interface 436 is used by the LPDd 422 in the Device 460 and the services of LPAd 420 to transfer a Bound Profile Package to the eUICC 430. The ES10c interface 438 is used between the LUId 426 in the Device 460 and the services of LPAd 420 for Local Profile Management by the End User 466.

The MNO 490 communicates with the End User 466 via the ESop interface 472. The ES6 interface 474 is used by the MNO 470 for the management of operator services via OTA services. MNO 470 has access to a SMDP+ 410 via the ES2+ interface 476. The MNO 470 uses the ES2+ interface 476 to order Profiles for specific eUICCs 430 as well as other administrative functions.

As described above, SM-DP+ 410 maintains a Profile Database 412, e.g., the profile Inventory.

The SMDP+ 410 determines the capability of Device 460, i.e., whether Device 460 is 4G capable or 5G capable 414. The SMDP+ 410 requests the OTA Server 450 to configure the eUICC 430 in Device 460 according to the device capability determined by the SMDP+ 410. The OTA Server 450 sends ETSI commands 452 via SMS (SCP-80) or via https (SCP-81) to create or remove a 5G File System in the eUICC, and to cause the OTA Server 450 to trigger the refresh applet in the eUICC 430 so that the eUICC 430 instructs Device 460 to perform a refresh so that Device 460 reads the File System again and thereafter request 4G or 5G authentication. The seamless eSIM profile transition at SMDP+ Server 410 via the OTA Server 450 is described in further detail herein below.

Figure 5:
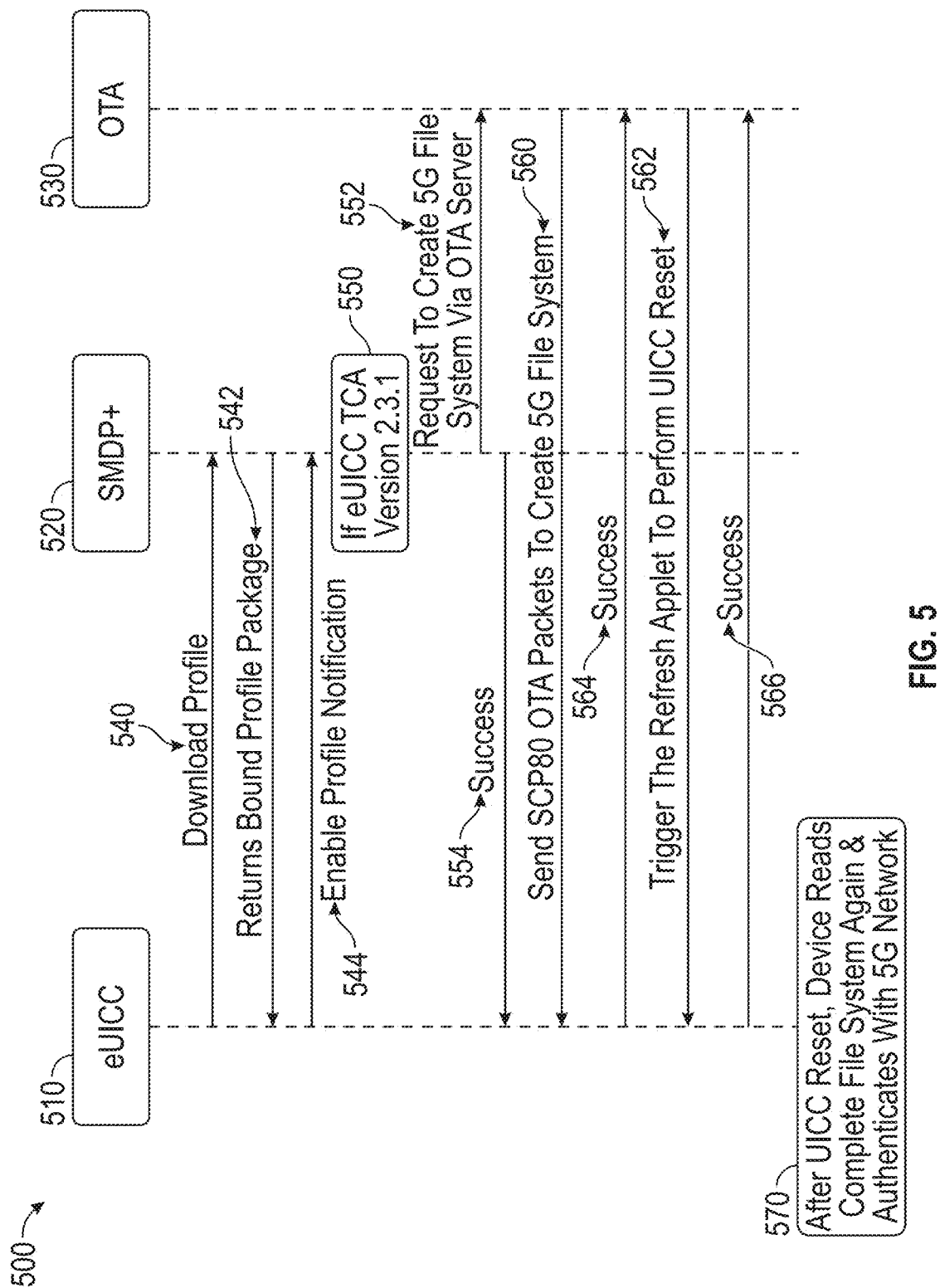
FIG. 5 is a flow diagram showing creation of a 5G File System by SMDP+ via OTA Server according to at least one embodiment.

FIG. 5 is a flow diagram 500 showing creation of a 5G File System by SMDP+ via OTA Server according to at least one embodiment.

A BSS creates the production batch for 4G File system. The eUICC 510 of a UE downloads a profile 540 from SMDP+ 520. For example, a Local Profile Assistant (LPA) receives ES9+ interface Bound Profile Package 542 including InitiateAuthentication, AuthenticateClient and GetBoundProfilePackage function and sends the Bound Profile Package to eUICC 510.

After download of profile in eUICC 510, the subscriber enables the profile and a profile notification 544 is generated by eUICC 510 that is sent to SMDP+ 520 via ES9+ Handle Notification Function. After receiving Enable Profile Notification, SMDP+ will change the state of profile as enabled and checks the Profile Version 550 which is downloaded in eUICC 510.

In response to the eUICC being 5G capable, SMDP+ Server 520 sends a request 552 to the OTA Server 530 to create 5G file system in UICC 510. SMDP+ determines eUICC 510 is 5G capable 550 based on determining the Profile TCA version is 2.1 (4G capable) and eUICC TCA Version is 2.3.1. SMDP+ Server 520 sends eUICC a response indicating success of enabling the profile 554.

Request 552 causes OTA Server 530 to create the 5G files 560 in eUICC 510, and to trigger the refresh applet in eUICC 510 to reset 562 and for eUICC 510 to read the file system files from eUICC 510 to cause eUICC 510 to request 5G authentication 570. Once the command to create the 5G files 560 are received by eUICC 510, eUICC 510 sends a success response 564 to OTA Server 530. Once the eUICC 510 has been reset, the eUICC 510 sends a success response 566 to the OTA Server 530.

In this way, 4G profile in eUICC 510 is converted into a 5G profile in the eUICC 510 and eUICC 510 authenticates with the 5G Network.

Figure 6:
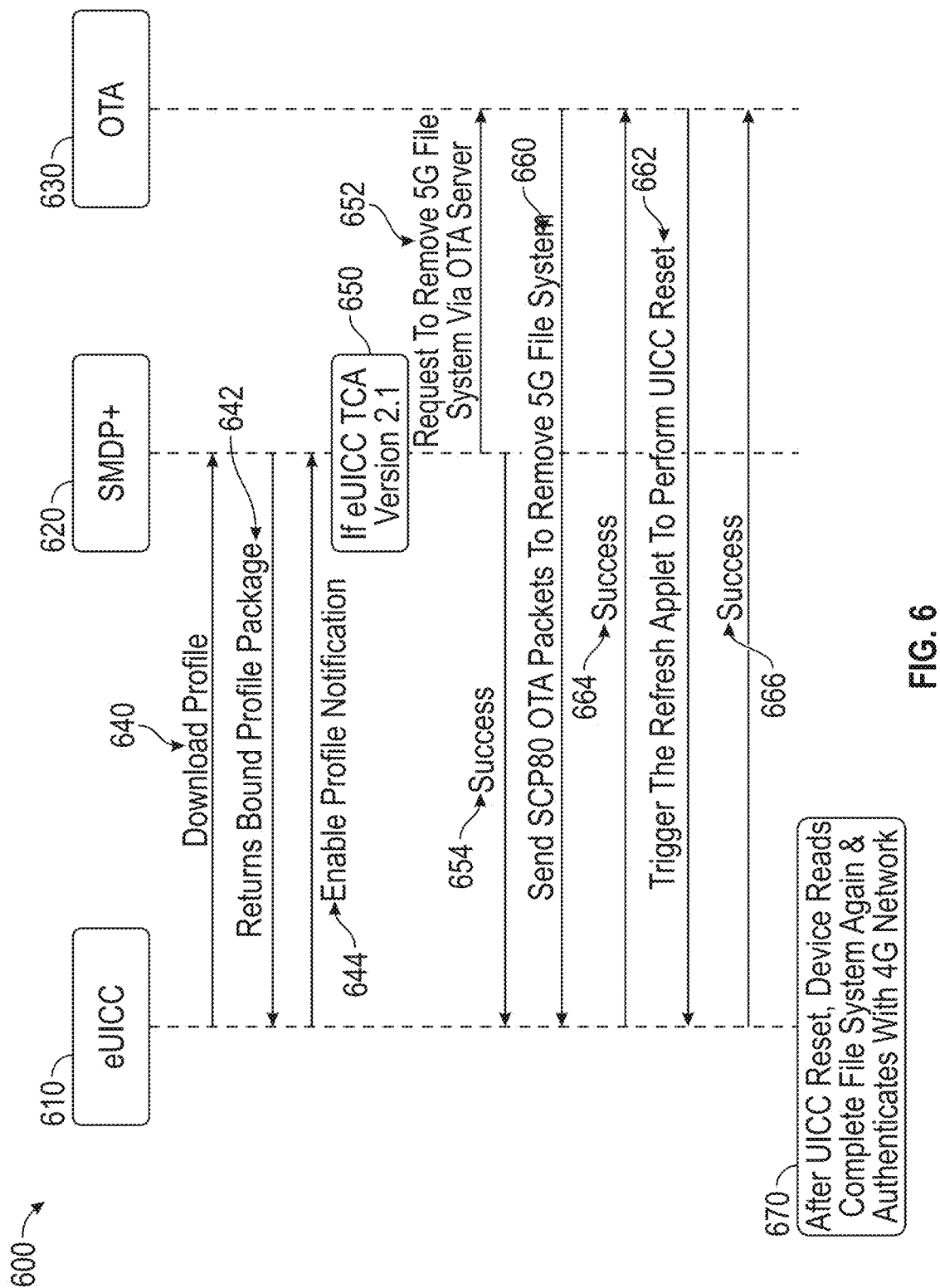
FIG. 6 is a flow diagram showing deletion of a 5G File System by SMDP+ via OTA Server according to at least one embodiment.

FIG. 6 is a flow diagram 600 showing deletion of a 5G File System by SMDP+ via OTA Server according to at least one embodiment.

A BSS creates the production batch for a 5G File system. The eUICC 610 downloads profile 640 from SMDP+ 620. Local Profile Assistant (LPA) receives ES9+ interface Bound Profile Package 642 including Initiate Authentication, AuthenticateClient and GetBoundProfilePackage function and sends the Bound Profile Package to eUICC 610

After download of profile in eUICC 610, the subscriber enables the profile from device LPA (Local Profile Assistant) application and a profile notification 644 is generated by eUICC 610 and sent by LPA to SMDP+ 620 via ES9+ Handle Notification Function.

After receiving Enable Profile Notification, SMDP+ will change the state of profile as enabled and checks the Profile Version 650 which is downloaded in eUICC 610.

In response to the eUICC being 4G capable, SMDP+ Server 620 sends a request 652 to the OTA Server 630 to remove the 5G file system in UICC 610. SMDP+ determines eUICC 610 is 4G capable 650 based on determining the Profile TCA version is 2.3.1 (5G capable) and eUICC TCA Version is 2.1. SMDP+ Server 620 sends eUICC a response indicating success of enabling profile 654.

The request 652 causes OTA Server 630 to delete the 5G files in eUICC 610 and to send a command to eUICC 610 to delete 5G files 660 inside the eUICC 510, and to trigger the refresh applet in eUICC 610 to reset 662 and for eUICC 610 to read the file system files from eUICC 610 to cause eUICC 610 to request 4G authentication 670. Once the command to delete the 5G files 660 is received by eUICC 610, eUICC 610 sends a success response 664 to OTA Server 630. Once the eUICC 610 has been reset, the eUICC 610 sends a success response 666 to the OTA Server 630.

In this way, the 5G profile in eUICC 510 is converted into a 4G profile in the eUICC 610 and eUICC 610 authenticates with the 4G Network.

Figure 7:
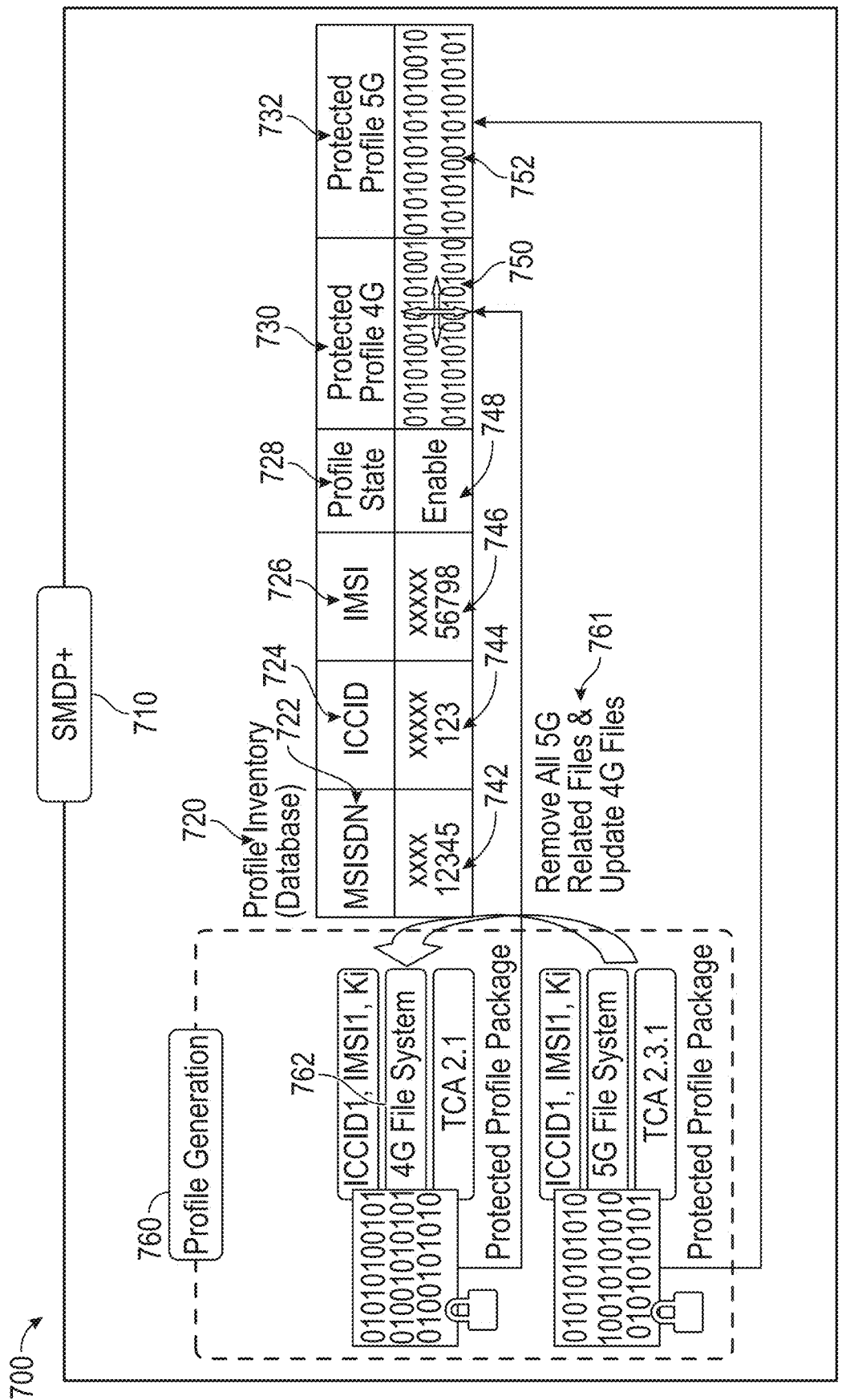
FIG. 7 is a diagram showing deletion of 5G related files according to at least one embodiment.

FIG. 7 is a diagram showing deletion of 5G related files 700 according to at least one embodiment.

In FIG. 7, a SMDP+ Server 710 is shown. SMDP+ Server 710 includes a Profile Inventory (database) 720. The Profile inventory has an entry having values for Mobile Station Integrated Services Digital Network (MSISDN) 722, Integrated Circuit Card Identification (ICCID) 724, International Mobile Subscriber Identity (IMSI) 726, a Profile State 728, Protected 4G Profile 730, and Protected 5G Profile 732. MSISDN 722 has a value of "xxx12345" 742, ICCID 724 has a value of "xxxx123" 744, IMSI 726 has a value of "xxxx56798" 746, and a Profile State 728 of Enable 748.

Two profiles, i.e., Protected 4G Profile 750, and Protected 5G Profile 752 are created for MSISDN 722, ICCID 724 and IMSI 726. Thus, memory is conserved. Profile Generation 760 of SMDP+ 710 deletes 761 5G related files from 4G File System 762 and makes minor adjustments to the 4G Profile. MNO information, i.e., MSISDN 742, ICCID 744, and IMSI 746, remains the same in both generated profiles, 4G Profile 750, and 5G Profile 752. SMDP+ 710 encrypts the 4G Profile 750, and 5G Profile 752 in Profile Inventory 720. One profile record is generated in Profile Inventory (database) 720 of SMDP+ 710.

Figure 8:
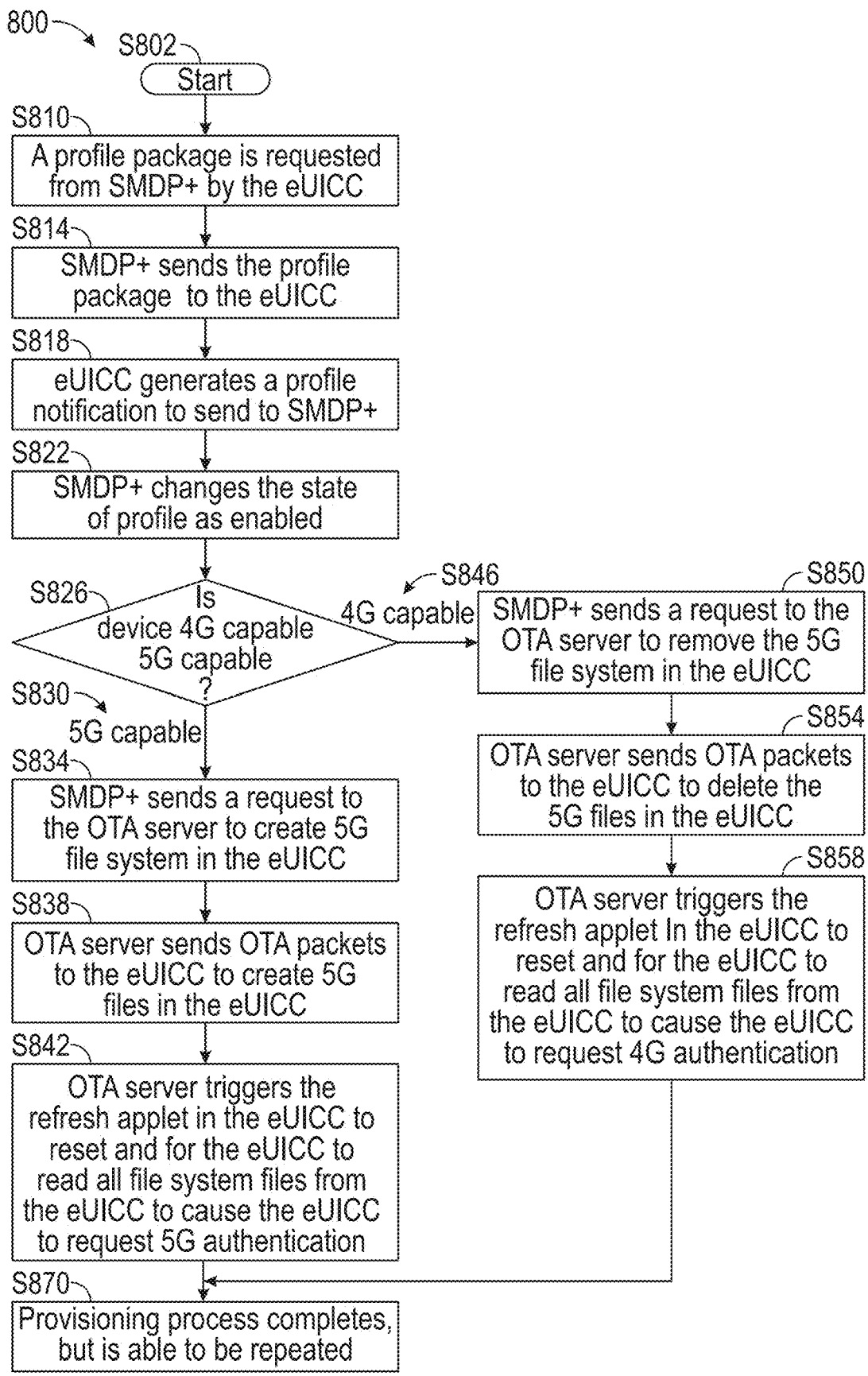
FIG. 8 is a flowchart of a method for providing seamless eSIM profile transition at Subscription Management Data Preparation (SMDP+) server via Over-The-Air (OTA) server according to at least one embodiment.

FIG. 8 is a flowchart 800 of a method for providing seamless eSIM profile transition at Subscription Management Data Preparation (SMDP+) server via Over-The-Air (OTA) server according to at least one embodiment.

In FIG. 8, the method starts S802 and a Profile Package is requested from SMDP+ by the eUICC S810. SMDP+ sends the Profile Package to the eUICC S814. Local Profile Assistant (LPA) receives ES9+ interface Bound Profile Package including InitiateAuthentication, AuthenticateClient and GetBoundProfilePackage function.

A Profile Notification is generated and sent to SMDP+ S818. The profile notification is generated by eUICC and sent by LPA to SMDP+ via ES9+ Handle Notification Function. SMDP+ changes the state of profile as enabled S822.

A determination is made whether the eUICC is 4G capable or 5G capable S826. SMDP+ determines eUICC is 5G capable based on determining the Profile TCA version is 2.1 (4G capable) and eUICC TCA Version is 2.3.1. SMDP+ determines eUICC is 4G capable based on determining the Profile TCA version is 2.3.1 (5G capable) and eUICC TCA Version is 2.1.

In response to determining the eUICC is 5G capable S830, SMDP+ sends a request to the OTA Server to create 5G File System in the UICC S834.

The OTA Server sends OTA packets to the eUICC to create 5G Files in the eUICC S838. OTA Server sends SMS or HTTPS commands to create a 5G files system in the eUICC.

OTA Server triggers the refresh applet in the eUICC to reset and for the eUICC to read the file system files from the eUICC to cause the eUICC to request 5G authentication S842.

In response to determining the eUICC is 4G capable S846, SMDP+ sends a request to the OTA Server to remove the 5G file system in the eUICC S850.

OTA Server sends OTA packets to the eUICC to delete the 5G files in the eUICC S854. OTA Server sends SMS or HTTPS commands to remove the 5G files system from the eUICC.

OTA Server triggers the refresh applet in the eUICC to reset and for the eUICC to read the file system files from the eUICC to cause the eUICC to request 4G authentication S858.

The provisioning process completes, but is able to be repeated S870.

At least one embodiment of the method includes receiving a request to download a profile package to an embedded Universal Integrated Circuit Card (eUICC) of a user equipment (UE), sending the profile package to the eUICC, determining a device capability of the eUICC, and based on the determined device capability of the eUICC, sending a request to an OTA server to configure the eUICC according to the determined device capability.

Figure 9:
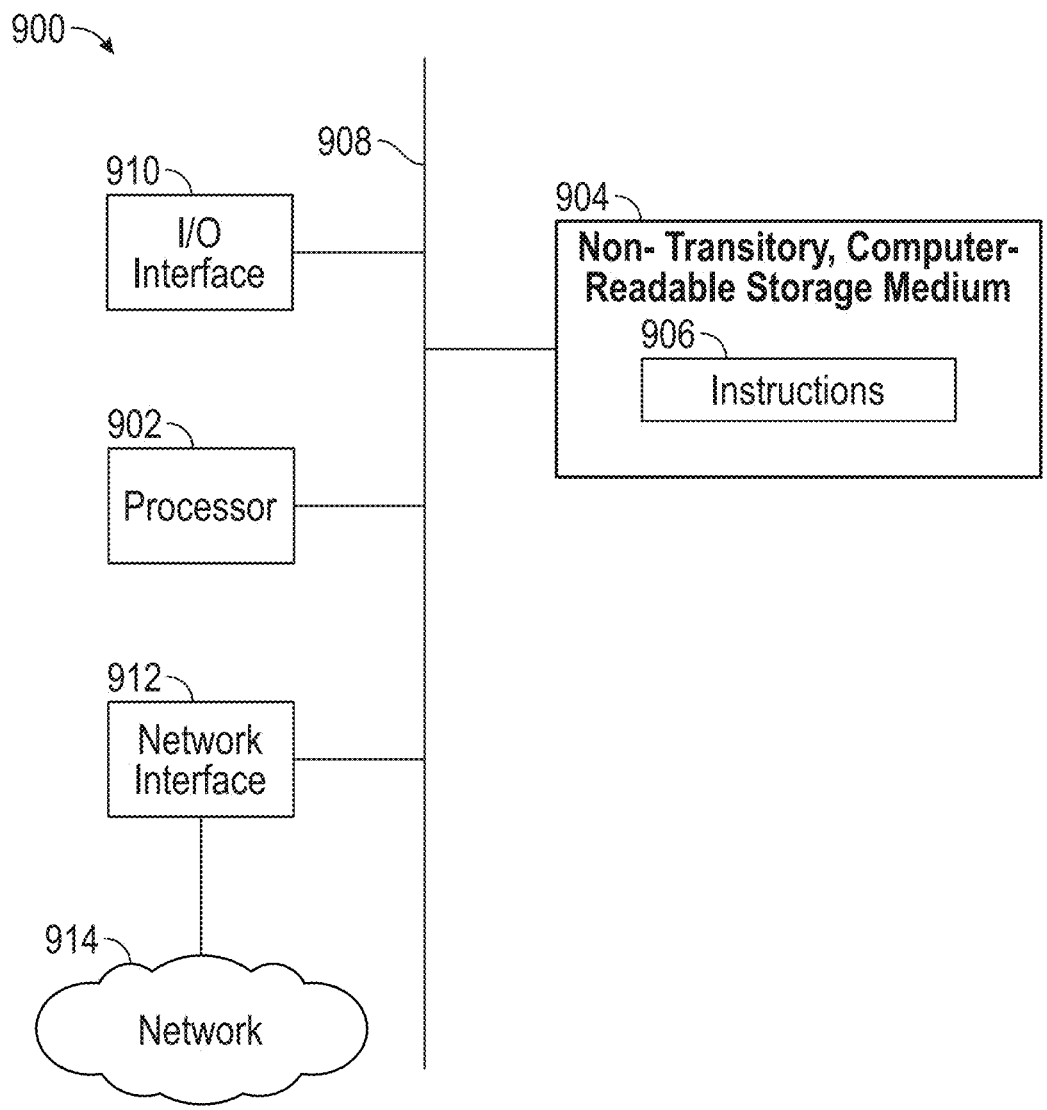
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 provides seamless eSIM profile transition at Subscription Management Data Preparation (SMDP+) server via Over-The-Air (OTA) server. Processing circuitry 900 implements providing seamless eSIM profile transition at Subscription Management Data Preparation (SMDP+) server via Over-The-Air (OTA) server. using processor 902. Processing circuitry 500 also includes a non-transitory, computer-readable storage medium 904 that is used to implement seamless eSIM profile transition at Subscription Management Data Preparation (SMDP+) server via Over-The-Air (OTA) server. Storage medium 904, amongst other things, is encoded with, i.e., stores, instructions 906, i.e., computer program code that are executed by processor 902 causes processor 902 to perform operations for providing seamless eSIM profile transition at Subscription Management Data Preparation (SMDP+) server via Over-The-Air (OTA) server. Execution of instructions 906 by processor 902 represents (at least in part) an application which implements at least a portion of the methods described herein in accordance with one or more embodiments (hereinafter, the noted processes and/or methods).

Processor 902 is electrically coupled to computer-readable storage medium 904 via a bus 908. Processor 902 is electrically coupled to an Input/output (I/O) interface 910 by bus 908. A network interface 912 is also electrically connected to processor 902 via bus 908. Network interface 912 is connected to a network 914, so that processor 902 and computer-readable storage medium 904 connect to external elements via network 914. Processor 902 is configured to execute instructions 906 encoded in computer-readable storage medium 904 to cause processing circuitry 900 to be usable for performing at least a portion of the processes and/or methods. In one or more embodiments, processor 902 is a Central Processing Unit (CPU), a multi-processor, a distributed processing system, an Application Specific Integrated Circuit (ASIC), and/or a suitable processing unit.

Processing circuitry 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

Processing circuitry 900 also includes network interface 912 coupled to processor 902. Network interface 912 allows processing circuitry 900 to communicate with network 914, to which one or more other computer systems are connected. Network interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O interface 910. The information received through I/O interface 910 includes one or more of instructions, data, design rules, libraries of cells, and/or other parameters for processing by processor 902. The information is transferred to processor 902 via bus 908.

In one or more embodiments, one or more non-transitory computer-readable storage media 904 having stored thereon instructions (in compressed or uncompressed form) that is used to program a computer, processor, or other electronic device) to perform processes or methods described herein. The one or more non-transitory computer-readable storage media 904 include one or more of an electronic storage medium, a magnetic storage medium, an optical storage medium, a quantum storage medium, or the like. For example, the computer-readable storage media includes, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 904 includes a Compact Disk-Read Only Memory (CD-ROM), a Compact Disk-Read/Write (CD-R/W), and/or a Digital Video Disc (DVD).

In one or more embodiments, storage medium 904 stores computer program code 906 configured to cause processing circuitry 900 to perform at least a portion of the processes and/or methods for providing seamless eSIM profile transition at Subscription Management Data Preparation (SMDP+) server via Over-The-Air (OTA) server.

In one or more embodiments, storage medium 904 also stores information, such as algorithm which facilitates performing at least a portion of the processes and/or methods for providing seamless eSIM profile transition at Subscription Management Data Preparation (SMDP+) server via Over-The-Air (OTA) server. Accordingly, in at least one embodiment, the processor circuitry 900 performs a method for providing seamless eSIM profile transition at Subscription Management Data Preparation (SMDP+) server via Over-The-Air (OTA) server.

In at least one embodiment, the method includes receiving a request to download a profile package to an embedded Universal Integrated Circuit Card (eUICC) of a user equipment (UE), sending the profile package to the eUICC, determining a device capability of the eUICC, and based on the determined device capability of the eUICC, sending a request to an OTA server to configure the eUICC according to the determined device capability.

The SMDP+ server provides at least the advantages of being able to automatically update a new device from an Over-The-Air (OTA) server to either create of delete files in eUICC to make it compatible with a determined device capability. Users are relieved from determining the details of the files for configuring a device. The provisioning of profiles at Subscription Management Data Preparation (SMDP+) server via Over-The-Air (OTA) server reduces the cost associated with generating eUICC profiles by telecom operators. Duplication of profiles for 4G and 5G subscribers is reduced thereby saving database storage at the SMDP+ side.

Separate instances of these programs are able to be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above are able to be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for provisioning a device profile, comprising:
   receiving, by a Subscription Management Data Preparation (SMDP+) server, a request to download a profile package to an embedded Universal Integrated Circuit Card (eUICC) of a user equipment (UE);
   sending, by the SMDP+ server, the requested profile package to the eUICC;
   determining, by the SMDP+ server, a device capability of the eUICC; and
   based on the determined device capability of the eUICC, sending a request by the SMDP+ server to an Over-The-Air (OTA) server to configure the eUICC according to the determined device capability by managing files in eUICC to make the eUICC compatible with the determined device capability.

2. The method of claim 1, wherein the determining the device capability of the eUICC further includes determining the eUICC is 5G capable in response to determining a Profile TCA version is 2.1 (4G capable) and an eUICC TCA Version is 2.3.1.

3. The method of claim 2, wherein the sending the request to the OTA server to configure the eUICC according to the determined device capability further includes sending the request to the OTA server to create a 5G file system and to send the 5G file system to the eUICC.

4. The method of claim 1, wherein the determining the device capability of the eUICC further includes determining the eUICC is 4G capable in response to determining a Profile TCA version is 2.3.1 (5G capable) and an eUICC TCA Version is 2.1.

5. The method of claim 4, wherein the sending the request to the OTA server to configure the eUICC according to the determined device capability further includes sending the request to the OTA server to remove 5G files from the eUICC and to send a command to the eUICC to remove the 5G files from the eUICC.

6. The method of claim 1, wherein the sending the request to the OTA server to configure the eUICC according to the determined device capability further includes sending the request to the OTA server to cause the OTA server to trigger a reset of the eUICC after the eUICC has been reconfigured.

7. The method of claim 6, wherein the determining the device capability of the eUICC further includes determining whether the device capability of the eUICC is 4G capable or 5G capable, and wherein the sending the request to the OTA server to configure the eUICC according to the determined device capability further includes, in response to determining the eUICC is 5G capable, sending the request to the OTA server to configure the eUICC using 5G files, and in response to determining the eUICC is 4G capable, sending the request to the OTA server to remove 5G files from the eUICC.

8. A Subscription Management Data Preparation (SMDP+) server for provisioning a profile, configured to:
   receive a request to download a profile package to an embedded Universal Integrated Circuit Card (eUICC) of a user equipment (UE);
   send the requested profile package to the eUICC;
   determine a device capability of the eUICC; and
   based on the determined device capability of the eUICC, send a request to an Over-The-Air (OTA) server to configure the eUICC according to the determined device capability by managing files in eUICC to make the eUICC compatible with the determined device capability.

9. The SMDP+ server of claim 8, configured to determine the device capability of the eUICC by determining the eUICC is 5G capable in response to determining a Profile TCA version is 2.1 (4G capable) and an eUICC TCA Version is 2.3.1.

10. The SMDP+ server of claim 9, configured to send the request to the OTA server to configure the eUICC according to the determined device capability by sending the request to the OTA server to create a 5G file system and to send the 5G file system to the eUICC.

11. The SMDP+ server of claim 8, configured to determine the device capability of the eUICC by determining the eUICC is 4G capable in response to determining a Profile TCA version is 2.3.1 (5G capable) and an eUICC TCA Version is 2.1.

12. The SMDP+ server of claim 11, configured to send the request to the OTA server to configure the eUICC according to the determined device capability by sending the request to the OTA server to remove 5G files from the eUICC and to send a command to the eUICC to remove the 5G files from the eUICC.

13. The SMDP+ server of claim 8, configured to send the request to the OTA server to configure the eUICC according to the determined device capability by sending the request to the OTA server to cause the OTA server to trigger a reset of the eUICC after the eUICC has been reconfigured.

14. The SMDP+ server of claim 8, configured to determine the device capability of the eUICC by determining whether the device capability of the eUICC is 4G capable or 5G capable, and wherein the processor is further configured to send the request to the OTA server to configure the eUICC according to the determined device capability by, in response to determining the eUICC is 5G capable, sending the request to the OTA server to configure the eUICC using 5G files, and in response to determining the eUICC is 4G capable, sending the request to the OTA server to remove 5G files from the eUICC.

15. A non-transitory computer-readable media having computer-readable instructions stored thereon, which when executed causes performance of operations for:
   receiving, by a Subscription Management Data Preparation (SMDP+) server, a request to download a profile package to an embedded Universal Integrated Circuit Card (eUICC) of a user equipment (UE);

sending, by the SMDP+ server, the requested profile package to the eUICC;

determining, by the SMDP+ server, a device capability of the eUICC; and based on the determined device capability of the eUICC, sending a request by the SMDP+ server to an Over-The-Air (OTA) server to configure the eUICC according to the determined device capability by managing files in eUICC to make the eUICC compatible with the determined device capability.

16. The non-transitory computer-readable media of claim 15, wherein the determining the device capability of the eUICC further includes determining the eUICC is 5G capable in response to determining a Profile TCA version is 2.1 (4G capable) and an eUICC TCA Version is 2.3.1.

17. The non-transitory computer-readable media of claim 16, wherein the sending the request to the OTA server to configure the eUICC according to the determined device capability further includes sending the request to the OTA server to create a 5G file system and to send the 5G file system to the eUICC.

18. The non-transitory computer-readable media of claim 15, wherein the determining the device capability of the eUICC further includes determining the eUICC is 4G capable in response to determining a Profile TCA version is 2.3.1 (5G capable) and an eUICC TCA Version is 2.1.

19. The non-transitory computer-readable media of claim 18, wherein the sending the request to the OTA server to configure the eUICC according to the determined device capability further includes sending the request to the OTA server to remove 5G files from the eUICC and to send a command to the eUICC to remove the 5G files from the eUICC.

20. The non-transitory computer-readable media of claim 15, wherein the determining the device capability of the eUICC further includes determining whether the device capability of the eUICC is 4G capable or 5G capable, and wherein the sending the request to the OTA server to configure the eUICC according to the determined device capability further includes, in response to determining the eUICC is 5G capable, sending the request to the OTA server to configure the eUICC using 5G files, and in response to determining the eUICC is 4G capable, sending the request to the OTA server to remove 5G files from the eUICC.

* * * * *